SCANNING SYSTEM

Filed Jan. 2, 1957

INVENTORS
JAMES L. LYON &
FREDERICK S. STAUFFER
BY Paul Bliven
ATTORNEY

United States Patent Office 2,930,899
Patented Mar. 29, 1960

2,930,899

SCANNING SYSTEM

James L. Lyon, San Jose, and Frederick S. Stauffer, Mountain View, Calif., assignors to International Business Machines Corporation, New York, N.Y., a corporation of New York Application January 2, 1957, Serial No. 632,129
3 Claims. (Cl. 250—233)

The present invention relates to a scanning system and in more particular to a scanning system for visible data. The purpose of the scanning may be for any one or more reasons. The data may be fed to printers, typesetting or casting machines, coding machines of all kinds, data processing devices, etc. While the principle of the present invention has been shown applied to the scanning of visible data, it is not so limited as will be obvious hereinafter.

It is an object of the present invention to devise a scanning system which will scan each data character presented to the scanner, in two non-parallel directions. This may be called scanning in two degrees. According to the invention, a character is scanned along two axes; however, the scanning member moves continuously in only one direction. This scanning is achieved by a rotationally driven scanning member having an aperture therein which scans the character along one of its axes, then the character is optically rotated a predetermined number of degrees, and a like aperture, moving and scanning in the same direction as the first, scans the reoriented character along a second axis thereof. In other words, the character is first scanned along one axis, the character is then rotated with respect to the direction of movement of the scanning member, and then the character is scanned a second time as the scanning member continues in its original direction. In this manner a smooth movement of the scanning member is maintained. Further objects are to effect such two degrees of scanning with a single moving scanner shutter, and that the motion of such moving shutter be motion of one degree.

Another object of the present invention is the devising of an optical system for projecting a character to be scanned so that a scanning motion of one degree will scan such character in two degrees.

A further object of the present invention is the performance of a data scanning process in which the data is scanned in two degrees by scanning traces moving in one degree.

While only the scanning of the number figure "5" has been illustrated in the accompanying drawings it would seem obvious how to apply the disclosed principles to the other number figures and to the letters of the alphabet. In some instances, it may be desirable to make some changes from conventional forms for the sake of further simplicity and accuracy in the reading. A code is not disclosed as there are many in the prior art, and the design of such is well known.

The above mentioned defects of the prior art are remedied and the mentioned objects achieved by projecting upon a rotating disc scanning shutter two images of the figure to be scanned. Each of the two images being rotated one with respect to the other ninety degrees so that shutter trace openings will scan the images collectively in two degrees while the motion of the shutter will be in only one degree.

A device such as outlined above is hereinafter described in detail and illustrated in the accompanying drawings, in which:

Figures 2 and 3 show the figure being scanned arranged at ninety degrees, one with respect to each other, and with the scanning apertures moving in the same direction and sense.

Figure 1:
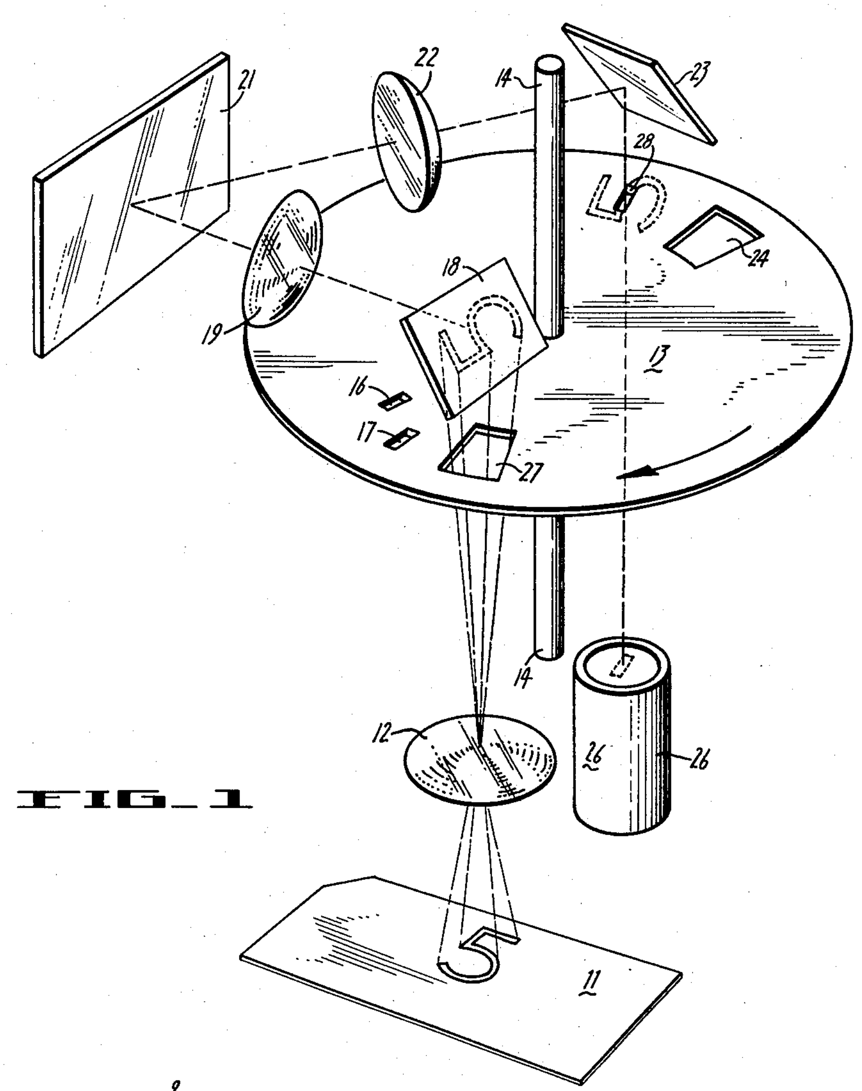
Fig. 1 is a diagrammatic perspective view of a data scanning mechanism embodying the present invention.

The perspective diagrammatic view of Fig. 1 illustrates the parts of a scanning system, in which parts the present invention is embodied. The circuits which would accompany the parts shown are not illustrated as there are various ones well known in the art. Reference numbers 1 to 7, inclusive, are used to designate certain of the zones, or blocks, formed by horizontal 8 and vertical 9 grid lines, $x$-lines and $y$-lines, respectively, which are considered to divide the field to be scanned. The data characters appearing in this field may be typed or printed on a sheet of paper 11 which is moved thru the field by any suitable means which will obtain the desired registry both as to location and speed of passage thru the field. The scanned field is illuminated by any suitable light source (not shown), and light reflected from the field is collected by an optical device 12, shown as a double convex lens, and projected on the lower surface of a rotatable disc 13 so as to reproduce on the disc the character found in the field to be scanned, the disc being opaque to the light. The disc 13 is fixed to a shaft 14 which is held by suitable bearings (not shown) for rotation so that the disc may have a single degree of movement, rotational movement. Such rotation may be had by driving the shaft 14, and the feed of the paper thru the scanned field may be synchronized with the disc rotation so that the disc makes one revolution for each character presented in the field or the disc may make several revolutions while each character is in the field. Further, the character may be at rest or moving while being scanned. The type of synchronization adopted will depend upon the circuits associated with the shown elements and with the results desired.

The rotation of the disc 13 is clockwise as viewed in Fig. 1 and the projected image on the lower side of the disc, called the $x$-image, is reversed by the optical device 12 from that on the paper 11 so that the character on the paper is scanned from left to right along the $x$-grid lines 8. The scanning along the $x$-lines is done by two slots 16, 17 formed in the disc 13. These slots are so placed that upon rotation of the disc one 16 of the slots will traverse the zones 5 and 6, and the other 17 slot will traverse the zones 2 and 3 of the projected image. Light passing thru the slots 16, 17 is reflected by a mirror 18 thru a plano-convex lens 19 to a second mirror 21, thru a second plano-convex lens 22, to a third mirror 23, thru a window 24 in the disc 13 and into a photo multiplier 26. The various lenses and mirrors above mentioned are an optical system such that a second image, called the $y$-image, of the character being scanned will be projected on the top face of the disc at a location removed from that part of the disc where the $x$-image is projected. The projection of the $y$-image occurs at the time an $x$-window 27 in the disc 13 is above the character being scanned. This $y$-image projection is so orientated by the optical system that a scanning slot 28 will scan the $y$-image along the $y$-grid lines 9 thru the zones 1, 4, and 7, in that order. Light passing thru the $y$-scanning slot 28, also, passes to the photo multiplier 26. t The photo multiplier is so connected in the electric circuits that as the characters are scanned and light is cut off by the scanning of a black portion of the characters an electric impulse will be given to the circuits. The circuitry analyzes the sum of such impulses from the $x$ and $y$ scanning so as to recognize the character scanned and to function in accordance therewith. The circuits are so timed with the disc rotation and so constructed that they distinguish between the $x$-scanning and the $y$-scanning.

Figure 2:
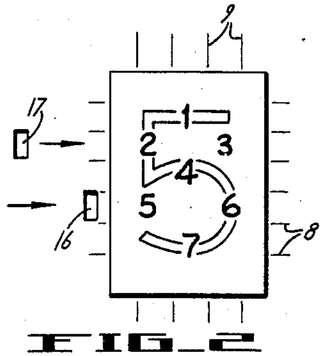
Fig. 2 is a view of a figure being scanned along its $x$-axis.
Figure 3:
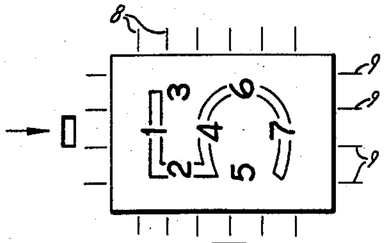
Fig. 3 is a view of the figure of Fig. 2 being scanned along its $y$-axis.

It should be observed that if the character of Figures 2 and 3 were to be scanned only along the $x$-grid lines that there would have to be five scanning traces. Thus, the present method saves two scanning traces. Also, the scanning of the present invention is done across the lines of the characters to a much greater extent than would be possible with scanning in only one degree. Scanning along the lines of a character requires very close registry if errors are to be reduced to a minimum. The wide spacing between the $x$-traces, also, reduces the need for small tolerances in the registry. Thus it will be seen that there are many advantages for the present process of and mechanism for scanning.

Other forms of radiant energy may be used as the scanning medium. The radiant energy may be located below the sheet 11 if such is translucent to such energy. The disclosed optical system is only illustrative of the elements needed to obtain the desired result. Those skilled in the optical art will understand the requirements of such a system and further refinements that may be made thereto.

Having thus described our invention, its construction, and its operation, we claim:

1. A reading device having therein means for moving data thru a scanning field, a rotatable disc scanning shutter having formed therein first and second windows and scanning trace apertures; and optical means for projecting from said field a first image on said disc and for passing a trace from said first scanning aperture thru said second window, and for projecting from said field a second image thru said first window onto said disc and a trace from said second image thru said second scanning aperture.

2. A scanning device for scanning alphanumeratic characters along at least two axes thereof comprising a cyclically driven scanning member, said member being generally opaque, means coupled to said member for driving said member continuously in one direction, a first and a second aperture formed in said member for scanning along first and second axes respectively of each character to be scanned, said apertures defining a scanning path under cyclic driving of said member, optical means operatively associated with said member for projecting into said path a first image of one of said characters, said image being oriented at a predetermined angle with respect to said path whereby said first image is scanned along one axis of the character, said optical means further including means operatively associated with said member for projecting into said path a second image of the same character, said second image being oriented with respect to said path at an angle different from said predetermined angle, whereby said second image is scanned along a second axis of the character while maintaining the cyclic movement of said member in only one direction.

3. The invention according to claim 2 wherein the angle of orientation between said first and second images is substantially ninety degrees.

References Cited in the file of this patent

UNITED STATES PATENTS

| | | |
|---|---|---|
| 2,179,243 | Ives | Nov. 7, 1939 |
| 2,228,782 | Sharples | Jan. 14, 1941 |
| 2,287,413 | Bruce et al. | June 23, 1942 |
| 2,301,199 | Bruce et al. | Nov. 10, 1942 |
| 2,415,190 | Rajchman | Feb. 4, 1947 |
| 2,578,307 | Hunt | Dec. 11, 1951 |
| 2,663,758 | Shepard | Dec. 22, 1953 |
| 2,772,479 | Doyle | Dec. 4, 1956 |